Oct. 31, 1944.  H. B. HOLTHOUSE  2,361,400
ELECTRICAL HEATER SYSTEM FOR LIQUID FUEL BURNERS
Filed March 10, 1942  3 Sheets-Sheet 1
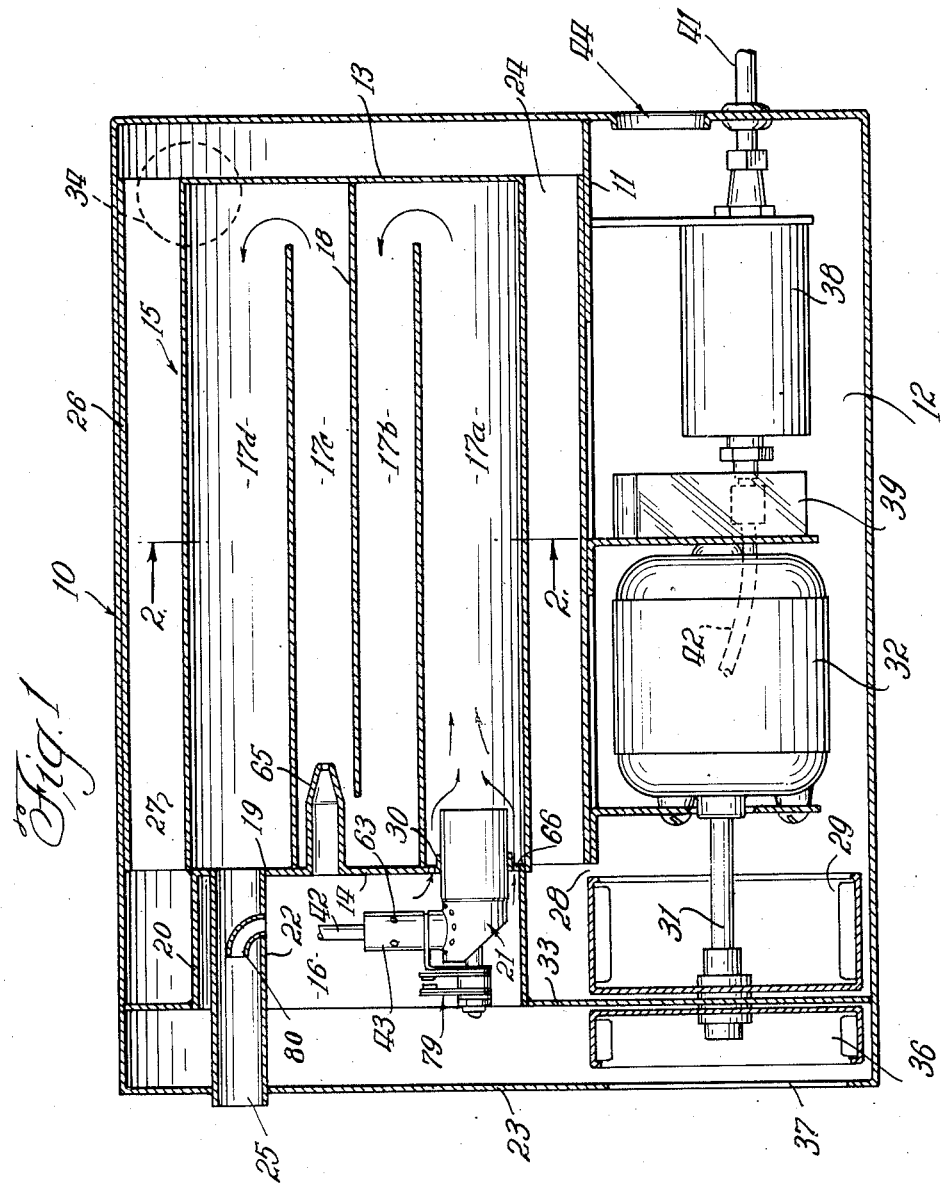
Inventor:
Harry B. Holthouse
By Foorman L. Mueller Atty.

Oct. 31, 1944.   H. B. HOLTHOUSE   2,361,400
ELECTRICAL HEATER SYSTEM FOR LIQUID FUEL BURNERS
Filed March 10, 1942   3 Sheets-Sheet 2
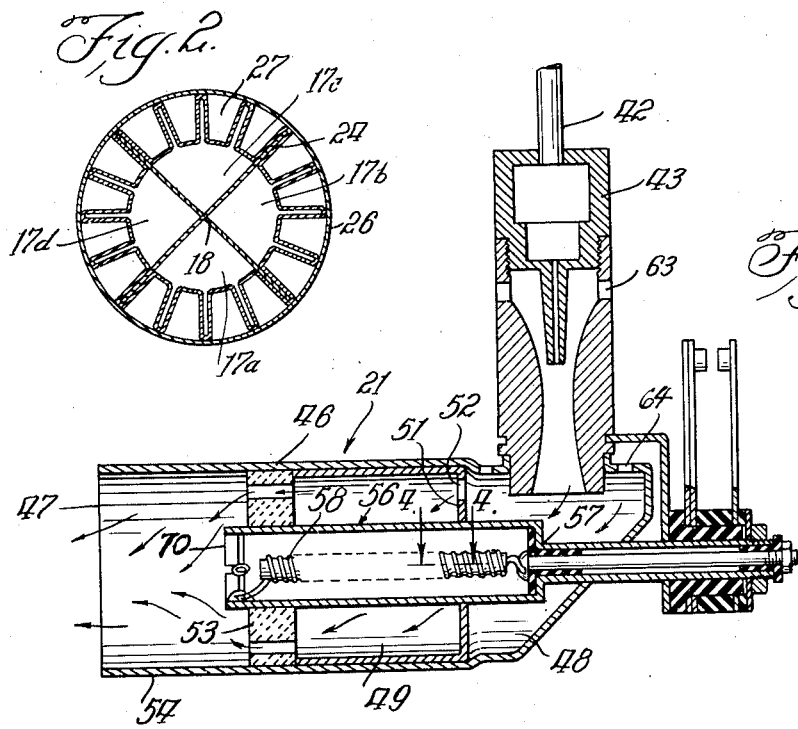
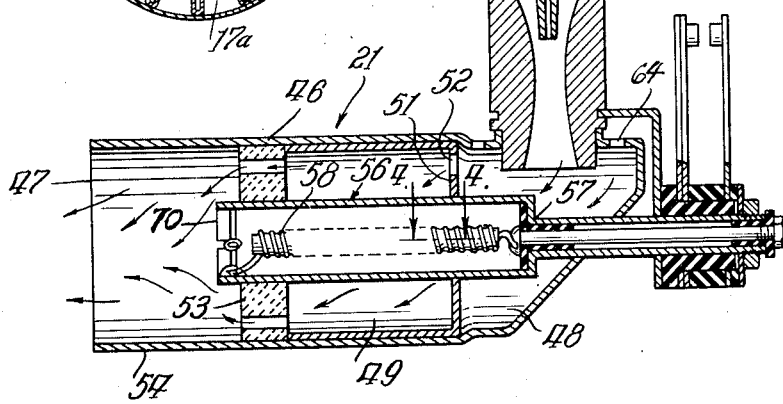
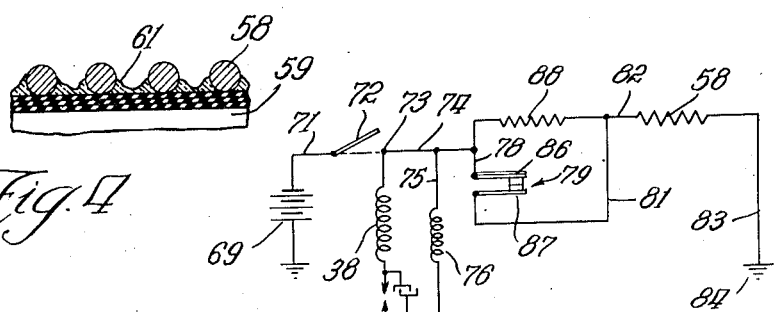
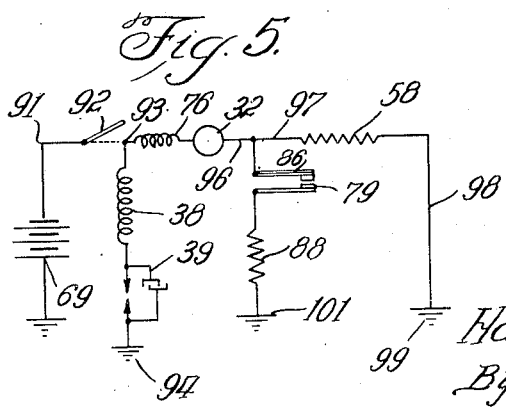
Inventor:
Harry B. Holthouse
By Toorman L. Mueller Atty.

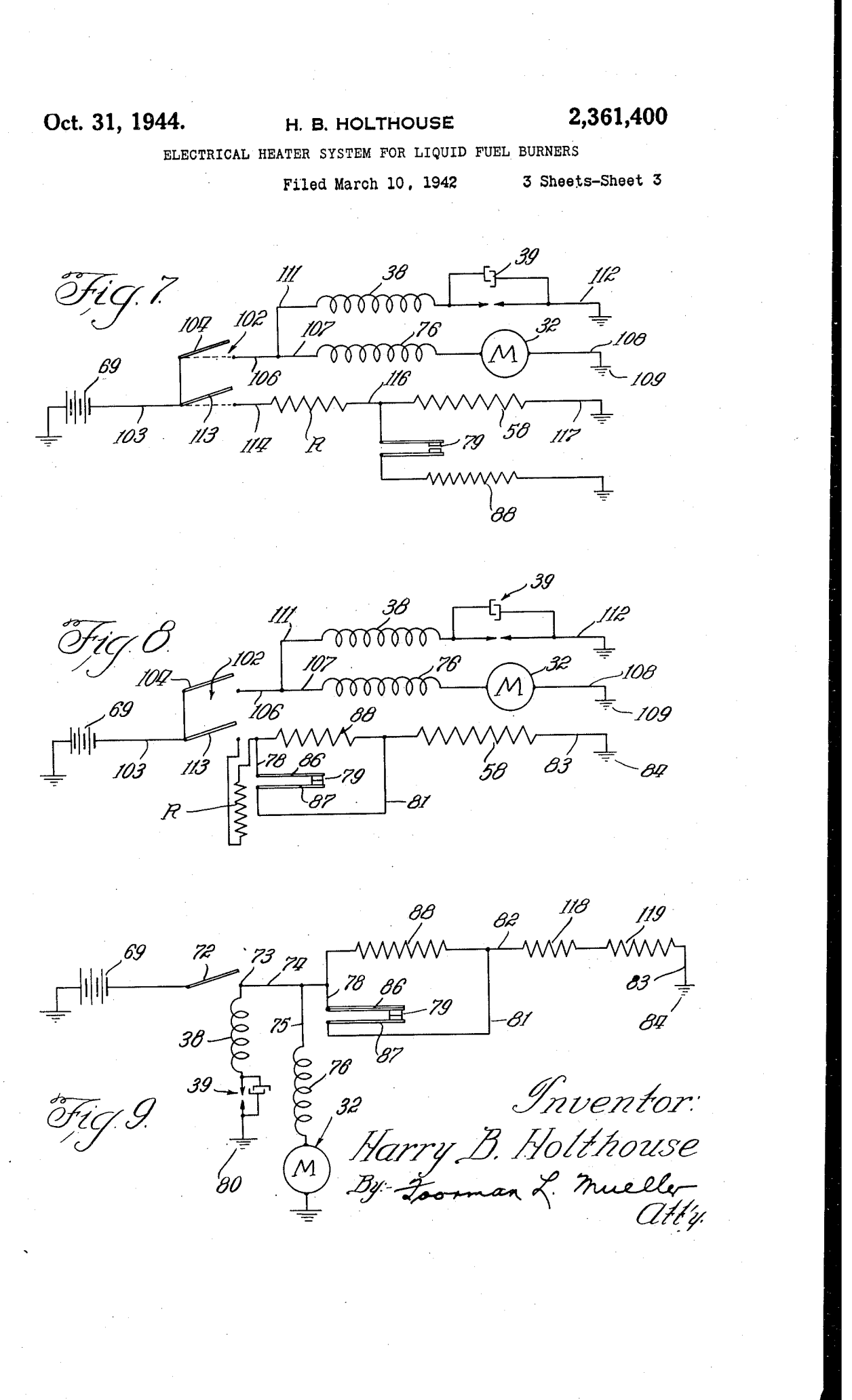

Oct. 31, 1944.     H. B. HOLTHOUSE     2,361,400
ELECTRICAL HEATER SYSTEM FOR LIQUID FUEL BURNERS
Filed March 10, 1942     3 Sheets-Sheet 3

Inventor:
Harry B. Holthouse
By Foorman L. Mueller
Atty.

Patented Oct. 31, 1944

2,361,400

UNITED STATES PATENT OFFICE 2,361,400

ELECTRICAL HEATER SYSTEM FOR LIQUID FUEL BURNERS

Harry B. Holthouse, Chicago, Ill., assignor to Galvin Manufacturing Corporation, Chicago, Ill., a corporation of Illinois Application March 10, 1942, Serial No. 434,068

10 Claims. (Cl. 219—39)

This invention relates generally to liquid fuel burners of internal combustion type and in particular to an electric heater system for a liquid fuel burner which is capable of operating efficiently over a long service life. This application is a continuation in part of application Serial No. 380,717 filed February 26, 1941.

In many types of liquid fuel burners in the prior art the electric heater systems used therewith include an electrical heater of resistance type which is utilized for heating the air and fuel mixture to be burned or for igniting the mixture for burning. These electric heaters are usually of coil type and in their use the fuel is generally passed into direct contact with the coil. The fuel contacting the coil cools the same and also covers it with a film of soot so as to appreciably reduce its efficiency for heating purposes. Further the fuel acts on the coil to corrode the same. As a result a large proportion of the heat generated by the coil is retained within the coil so that it operates at temperatures in excess of those for which it is designed and soon burns out. Another factor which appreciably affects the life and operation of the heater coil is the location of the coil such that it is exposed to the flames of combustion. The flames keep the coil excessively heated and accelerate the corroding action of the fuel thereon. All of these factors, therefore, contribute to materially shorten the operating life of the coil while reducing the efficiency of its operation over the span of its service life.

Further difficulties in providing a heater coil system capable of long life operation with maximum efficiency are encountered when the system is operated from a source of variable power supply. The design of a coil is generally predicated on the available watt input for operating the coil and the desired temperature at which the coil is to operate. Where the power supply is constant this operating temperature, of course, will also be substantially constant. A coil operating in a system of variable power supply, however, will operate at temperatures which vary between certain limits corresponding to the magnitude of power fluctuation. Thus the life of a coil while operating at its high temperature limit will be much shorter than the life of the same coil when operating at its lower temperature limit. In order to conserve the life of the coil as much as possible, while also providing for its efficient operation to accomplish the purpose for which it is designed, it is apparent that a prolonged operation thereof at its high temperature limit must be avoided.

The variation in the power supplied to a coil creates a very difficult problem particularly when the power supply is of a relatively low value, such as for example the battery power available for heating systems of internal combustion type used with cars, trucks, planes and the like. These batteries may vary in size from 6 volts to 24 volts. The power supplied by these batteries, of course, varies with their changed condition. Thus for example a battery rated at 24 volts will have a low charge voltage of 20 volts and a high charge voltage of 28 volts to give an over-all variation of 8 volts between these two charged conditions. Because of the low battery voltage the heater coil utilized in these internal combustion type heating systems are of a rather delicate construction so that any prolonged operation thereof at a high temperature limit corresponding to a battery condition of high charge would shorten their operating life to a matter of but a relatively few hours. Maintenance and service costs would thus be excessively high and more importantly the heating system would be incapable of heavy duty use. Where these air heating systems are used with mobile craft such as in the heating of bomber plane engines for starting purposes, in Signal Corps vehicles and the like, a frequent burning out of the coils would be a hazardous risk for reasons which are believed to be apparent.

Many attempts have been made to eliminate these shortcomings in the operating life and efficiency of the electric heater systems of the prior art liquid fuel burners but so far these attempts have been unsuccessful.

It is an object of this invention, therefore, to provide an improved liquid fuel burner of internal combustion type.

It is another object of this invention to provide an improved electric heater system for a liquid fuel burner of internal combustion type.

A further object of this invention is to provide a long-life electric heater system for a burner of internal combustion type.

Yet another object of this invention is to provide an electric heater system in which the heater unit is out of contact with the combustible mixture and removed from the flames of combustion so as to prolong its life and efficiency.

Another object of this invention is to provide an electric heater system for an internal combustion type heater in which an electric heating unit receiving energy from a source of variable supply is operated with maximum efficiency over a prolonged service life.

A further object of this invention is to provide an electric heater system which is simple in design, comprised of but few parts, readily adapted to be used for a plurality of applications, and capable of operating efficiently over a prolonged service life with a minimum of maintenance attention.

A feature of this invention is found in the provision of an electric heater capable of being operated from a low voltage source to develop a heat sufficient for fuel ignition purposes and of a construction such that when initially energized it reaches a point of maximum heat output in a minimum of time.

A further feature of this invention is found in the provision of an electric heater system having a variable source of energy supply for operating an electric heater adapted to be heated to a predetermined temperature when the energy supply is at some known minimum value, in which thermostatic switch means responsive to the predetermined temperature of the heater operates electrical means adapted to decrease the energy supplied to the heater when the heater becomes heated to such predetermined temperature.

Another feature of this invention is found in the provision of an electrical heater system including a circuit having an electrical heater and a ballast resistor for limiting the current supply to the heater, and means for decreasing the current supply when the value thereof exceeds a predetermined value providing for a prolonged life of the electrical heater.

Further objects, features, and advantages of this invention will become apparent from the following description when taken in connection with the accompanying drawings in which:

Fig. 1 is a longitudinal sectional view of an air heating system of internal combustion type adapted for operation with liquid fuel, the combustion chamber being shown in development for the purpose of clarity;

Fig. 2 is a sectional view of the combustion chamber taken along the line 2—2 of Fig. 1;

Fig. 3 is an enlarged detail view of an air and fuel conditioning unit utilized in the heating system of Fig. 1;

Fig. 4 is an enlarged fragmentary sectional view of the electrical heater in the conditioning of Fig. 3 as seen along the line 4—4 of Fig. 3;

Fig. 5 shows diagrammatically one form of control circuit for the heater of Fig. 1 having a voltage regulating resistor adapted to be connected in parallel with the heater coil;

Fig. 6 is a modified form of a control circuit for the heating system of Fig. 1 showing a voltage regulating resistor adapted for series connection with the heater coil;

Fig. 7 is a modification of the control circuit of Fig. 5;

Fig. 8 is a modified form of the control circuit in Fig. 6; and

Fig. 9 is a circuit similar in all respects to the control circuit of Fig. 6 except that the heater coil is illustrated as comprising two sections connected in series.

In practicing this invention there is provided an air heating system of internal combustion type having an air and fuel mixing device in fluid flow relation with a combustion chamber. The mixing device has a combination electric heater unit for conditioning the air and fuel to be burned and for igniting such air and fuel mixture for burning. The electric heater unit includes a single resistance coil as the heating element therefor. The heating system of this invention is illustrated in Fig. 1, in one commercial embodiment thereof, as applied to space heating in a mobile craft, with the electric heater unit as well as all of the operating parts of the heater, being adapted for operation from the craft battery.

In a mobile craft such as the usual automobile or large trucks and planes, it is well known that the battery voltage varies with the charged condition thereof. To assure a proper operation of the heating system at all times, therefore, the resistance coil of the electric heater unit is such that it is capable of developing a heat of a predetermined temperature value when the battery of the mobile craft is in a condition of low charge. Since the power of the usual mobile craft battery is generally very low the coil for the electric heater unit is composed of a rather fine wire and therefore capable of operation over a rather limited range of voltages without burning out.

To provide for a long life operation of the electrical heater with the varying potentials arising from the use of a battery as the source of energy supply, the circuit for the heater coil in one embodiment of the invention includes a ballast resistor for limiting the flow of current through the heater coil. The control circuit for the heater coil includes further a shunt circuit for the heater coil having a resistor and a thermostatic switch responsive to the temperature of the heater coil adapted to connect the resistor into the circuit of the heater coil to decrease the flow of current therethrough. The resistor serves to decrease the current flow through the heater coil while still retaining the coil at a temperature such that the heater system is efficiently operated. In another embodiment of the invention the circuit for the heating coil includes a current limiting device and a thermostatic switch means responsive in operation to the temperature of the heating coil to control the connection of the current limiting device relative to the heating coil to reduce the current applied on the heating coil after it has been heated to a predetermined temperature. It is to be understood that in these embodiments of the invention the thermostatic switch may be operated even when energy is supplied to the heater coil at a low charge condition of the battery since the switch is responsive to the temperature of the coil. However, since the heater coil is more rapidly heated when the battery is in a condition of high charge, its operation at a high temperature corresponding to such high charge will be very short. Any prolonged operation of the coil at a high temperature is thus eliminated.

Further because of the low voltage of the battery an appreciable time delay might be involved in the heating of the coil to an optimum temperature due to the conduction of the generated heat to surrounding objects. To facilitate the heating action of the heater coil and to reduce this time delay to a minimum the electrical heating unit is of a construction such that the conduction of heat from the coil is substantially eliminated. Practically all of the heat generated is thus utilized in bringing the coil up to its optimum temperature as quickly as possible.

As previously explained in the discussion of the prior art liquid fuel burners, the contacting of the incandescent or hot coil of the electric heater unit with the combustible mixture acts to materially shorten the life of the coil. In the present invention this difficulty is minimized by disposing the heating element 58 within the tube 54 and out of the combustion chamber. As a result, the combustible mixture on being ignited is immediately projected away from the coil so that the burning of the mixture takes place at some point remote from the coil. The coil is thus entirely out of the flames of combustion and not subjected to the intense heat therefrom.

Referring to Fig. 1 of the drawings the heater of this invention is seen to include a housing 10 which is divided longitudinally thereof over substantially its entire length by a vertically extending partition member 11 to provide a mechanical compartment 12 and a heating compartment. Within the heating compartment is a substantially cylindrically shaped combustion chamber 15, shown in development in Fig. 1 for the purpose of clarity, which is closed at one end by a cover plate 13 and at its opposite end by the bottom 14 of a substantially dish-shaped member 20 which defines in part an air supply chamber 16 in axial alignment with the combustion chamber 15.

The combustion chamber 15 is divided longitudinally thereof into four axially extending but connected passages 17a—17d by a partition member 18 of substantially X-shape (Figs. 1 and 2). The combustion chamber inlet 30 and outlet 19 are formed in the bottom portion 14 of the dish-shaped member 20 in communication with the passages 17a and 17d, respectively. Located within the inlet 30 is an air and fuel mixing unit, indicated generally as 21, which is extended within the air supply chamber 16. The outlet 19 is provided with a tail pipe 22 extended through the air supply chamber 16 and outwardly from the heater at the housing end 23.

The outer wall or body portion of the combustion chamber 15 is provided with angularly spaced axially extending fins 24. The fins 24 have a sleeve 26 positioned about the outer ends thereof so as to form an angular passage 27 about the combustion chamber 15 for air to be heated. The air to be heated is admitted into the passage 27 through an inlet 28 connecting the passage with the mechanical compartment 12 and is circulated through the passage 27 by a fan 29 located within the compartment 12 and mounted on a shaft 31 of an electrical motor 32. The compartment 12 and air passage 27 are separated from the air supply chamber 16 by a sealing or partition member 33 extended transversely of the housing 10. From Fig. 1 it is seen that the air supply chamber 16 is defined by the member 20, the partition member 33, and the end 23 of the housing 10. Air circulated by the fan 29 is thus confined to travel within the compartment 12 and passage 27 and is discharged from the passage through an outlet 34 which is connected to a space to be heated.

The air supply chamber 16 receives air from a fan 36 located therein and mounted on the motor shaft 31 which is journalled in the partition plate 33. An inlet 37 for the fan 34 is provided in the housing end 23. It is seen, therefore, that the fans 29 and 36 are operated by the motor 32 and are mounted directly on the shaft 31 thereof. The motor 32 is also utilized in the operation of a fuel pump 38 which is illustrated as being of solenoid type. The breaker assembly 39 for controlling the energization of the pump 38 is operatively associated with the motor shaft 31. Fuel for the pump 38 is supplied thereto from a suitable source (not shown) through a pipe 41 and is delivered through a pipe 42 to a fuel injection nozzle 43 formed as a part of the air and fuel mixing means 21. The pump 38, motor 32 and fan 29 are thus all located within the mechanical compartment 12, which is provided with an inlet 44 for supplying either fresh or recirculated air to the fan 29 for delivery to the air passage 27.

The air and fuel mixing means 21, previously mentioned, includes a substantially tubular shaped housing member 46 which is closed at one end and open at the end 47 thereof with the passage 17a (Figs. 1 and 3). A mixing chamber 48 is located at the closed end of the casing 46, and is separated from an equalizing chamber 49 by a plate member 51 having perforations 52 therein. The equalizing chamber 49 in turn is both defined and separated from the combustion chamber passage 17a by a perforated heat insulating plate 53 spaced inwardly from the end 47 of the casing 46 so that a rim portion 54 projecting beyond the plate 53 is provided at such end. Extended substantially axially through the casing 46 and supported in the partition plates 51 and 53 and projecting outwardly from the closed end of the casing 46 is a combination electric heating and igniting unit 56.

The unit 56 includes a tubular copper sleeve 57 having an enlarged portion supported in the plate members 51 and 53 and adapted to receive in a spaced relation therein a resistance coil 58. A reduced section of the sleeve 57 is supported in the closed end of the casing 46 and projects outwardly therefrom for a purpose to be later noted. The coil 58 is wound on a mica tube 59 which has both heat and electrical insulating characteristics. In one commercial embodiment of the invention the resistance coil 58 is composed of #20 wire adapted to be heated to about 1600° F. with 20 volts at 9½ amperes. The coil 58 is thus rather delicate and of a small size so as to be incapable of supporting itself in a spaced relation with respect to the copper tube 57 when secured at opposite ends thereof to the tube. The mica tube 59 thus retains the coil 58 in a supported position within the tube 57.

It is well known, of course, that mica is acted upon by heat so that in time the mica tends to buckle and disintegrate. When this action occurs it often happens that adjacent ones of the turns of the coil 58 contact each other so as to short out a portion of the coil 58. Because of the limits to which the coil 58 must be designed to provide a predetermined optimum temperature from a known relatively low power supply the shorting out of only one turn thereof might possibly result in a burning out of the entire coil. In order to preserve the mica tube 59 against the deteriorating effects of the heat from the coil 58 and any consequent shorting of the coil a porcelain coating or like insulating material indicated at 61 is applied on the mica body portion between the turns of the coil 58. This porcelain coating is such that the upper half or part of each turn of the coil 58 is left bare so that heat is readily radiated therefrom. The porcelain coating functions also to bond together the coil 58 and the mica portion 59 so as to positively fix each turn of the coil 58 on the mica body. The porcelain coating completely protects the mica tube 59 from direct contact with the heat from the coil 58 and also gives added strength and rigidity to the tube 59.

In the embodiment above-mentioned using a #20 wire for the coil 58 the mica tube 59 has a thickness of approximately .0125". Because of the low heat conductivity of mica the heat developed by the coil 58 is substantially completely utilized to raise the heat of the coil to an optimum temperature with a minimum time delay. It is readily apparent, of course, that where a solid body portion is used, such for example as a solid porcelain body, a rather large proportion of the heat generated by the coil 58 would be conducted and absorbed by the porcelain body portion so as to produce an objectionable time delay in the heating of the coil to an optimum temperature. This disadvantage is completely eliminated by the coil structure of this invention while providing a coil structure of a rugged construction.

In the operation of the air and fuel mixing means 21 the fuel delivered to the injection nozzle 43 by the pump 38 is injected into the mixing chamber 48, the fuel nozzle being located within the air supply chamber and mounted directly on the casing 46 at the chamber 48 (Fig. 3). A portion of the air for mixing with the fuel enters the nozzle 43 through ports 63 in the fuel nozzle and travels with this fuel into the mixing chamber 48. Additional air for mixing with the fuel in the chamber 48 is admitted directly into the mixing chamber 48 through apertures 64 formed in the casing 46 about the fuel injection nozzle 43. The fuel within the mixing chamber 48 is heated to at least a fuel vaporizing temperature by the heating unit 56 to facilitate its thorough mixing with the air in the mixing chamber. The casing 46 and partition plates 51 are provided in a heat conducting material and are in thermal connection with the combination heating and igniting unit 56 so as to readily receive heat therefrom. The vaporous air and fuel mixture passes through the apertures 52 in the plate 51 into the equalizing chamber 49. The equalizing chamber 49 in cooperation with the heat insulating plate 53 acts to reduce the turbulence in the mixture and to disperse the mixture substantially uniformly over the entire cross section of the casing 46 so that a mixture of substantially uniform fuel characteristics passes through the perforated heat insulating plate 53 into the effective igniting zone of the electrical heating unit 56.

Thus as is indicated by arrows in Fig. 1 the air and fuel admitted into the mixing chamber 48 contacts the tube 57 and chamber wall portions to be conditioned by the heat in these parts. The air and fuel mixture is retained in a vaporous form in the equalizing chamber by the heat passed into the equalizing chamber by the coil 58 through the tube 57. The combustible mixture is then passed about the tube 57 through the apertured plate 53 and across the open end 70 of the tube 57 into the effective igniting zone of the unit 56. In other words the combustible mixture is ignited by virtue of the temperature at the end of the element 58 being of a degree or value capable of igniting such mixture. This temperature for one kind of fuel is about 1600° F., the above noted commercial coil being adapted to generate this temperature at 20 volts. Thus the element 58 is utilized to preheat the fuel and air mixture and to ignite this mixture within the combustion chamber.

The air and fuel mixture prepared in the air and fuel mixing means 21 is initially rich to facilitate its ignition. It is well known, of course, that although a rich mixture is more readily ignited than a lean mixture, such rich mixture cannot be efficiently and completely burned. This initially rich mixture therefore after being ignited is leaned by the addition thereto of secondary or supplementary air from the air supply chamber 16 through ports 66 arranged about the air and fuel mixing means 21 at the combustion chamber inlet 30. Because of the rim portion 54 at the open end 47 of the casing 46 this supplementary air does not contact the mixture from the mixing means until after such mixture has passed outwardly from the mixing means and away from the combination unit 56 as indicated by the arrows in Fig. 1. Only the initially rich mixture, therefore, is ignited by the combination unit. Further supplementary air is admitted into the combustion chamber 15 through a tube 65 supported in the base portion 14 of the member 20 and fluid connecting the air supply chamber 16 with the combustion passage 17c (Fig. 1).

The air supplied to the air supply chamber 16 and admitted therefrom into the combustion passage 17a through the mixing means 21, ports 66, and tube 65 functions to move the mixture through the combustion chamber 15 so as to scavenge the same. The air thus admitted into the combustion chamber 15 acts, therefore, to push the mixture through the combustion chamber. A pulling action on the mixture at the outlet 19 of the combustion chamber 15 is accomplished by means including an elbow portion 80 located within the exhaust pipe 22 and fluid connecting the same with the air supply chamber 16. The elbow portion 80 has the inner end thereof faced away from the outlet 19 so that the air passing therethrough from the chamber 16 creates a Venturi action at the outlet 19. The Venturi action creates a suction pressure at the combustion chamber outlet 19 so as to reduce the back pressures in the passage 17d. A positive movement of all mixtures through the combustion chamber 15 is thus assured by this complementary action of the supply air which concurrently functions to both push the mixture into the combustion chamber 15 at the inlet and to pull the same outwardly from the outlet thereof. The mixture thus flows through the combustion chamber 15 at a substantially uniform rate at all times of heater operation.

As a result of this mixture flow as produced by air from the supply chamber 16 the combustible mixture, ignited by the coil 58 as such mixture passes across the open end 70 of the tube 57, is immediately projected or carried away from such open end and into the combustion passage 17a. By virtue of this projection of the ignited mixture away from the electrical heating unit 56 the burning of the mixture takes place at a zone remote from the electrical heating unit, so that the heating unit is not exposed to the flames of combustion. This construction of the electric heater system serves to prolong the life of the electrical heating unit 56 for the reasons noted above.

As was previously mentioned the coil 58 is of a relatively light construction so as to produce a predetermined heat within a particular range of available power. As a result the coil can readily be burned out because of any wide variations in the energy supplied thereto or of a relatively prolonged operation at high temperatures.

To eliminate danger of the coil burning out due to prolonged operation at excessive temperatures means are provided for automatically decreasing the current flow through the coil 58 after it performs a predetermined heating function.

Thus referring to Fig. 6 there is shown a control circuit for the heater of Fig. 1 having as a source of power a battery indicated at 69. The circuit for the pump 38 from the battery 69 includes conductor 71, a main control switch 72, terminal 73, the pump 38, breaker assembly 39 and a ground connection 80. The motor 32 is connected in parallel with the pump 38 the circuit thereof from the terminal 73 including conductors 74 and 75, a motor field coil 76, the motor 32 and a ground connection 77. The normal operating circuit for the heater coil unit 58 from the battery 69 includes conductor 71, switch 72, conductors 74 and 78, a normally closed thermostatic switch unit 79, conductors 81 and 82, the heater coil 58 and a connection to the ground 84. The closed position of the switch 72 for operating the control system is shown in dotted lines in Fig. 6.

The thermostatic switch unit 79 (Figs. 1 and 3) is comprised of a bi-metal contact 86 and an associated contact 87. This switch unit is responsive to the temperature of the air and fuel mixing means 21 and is mounted on the projecting end of the electrical heating unit 56 about the copper tube 57. Thus as was previously noted, in one commercial application of the electrical heating unit 58 there was developed by the coil 58 a temperature of 1600° F. with 20 volts at 9½ amperes. The temperature of the air and fuel mixing means 21, however, is of course substantially less than this temperature of the coil 58 and has a corresponding temperature of about 200° F. For one kind of liquid fuel used the temperature of 1600° F. is sufficient for ignition and the 200° F. for vaporization. A temperature of 200° F. of the mixing means denotes a temperature of the coil 58 of at least 1600° F. In other words the coil 58 may be heated about 1600° F. before the chamber 48 is heated to 200° F. because of the time delay required for the conduction and radiation of heat from the coil 58 to the tube 57, partition 51 and casing 46. Thus for example assume the coil 58 to be heated to 1600° F. with 20 volts at 9½ amperes representing a low charge condition of a normal 24 volt battery. At 25 volts, the coil will reach its optimum temperature of 1600° F. in less time than would be required at 20 volts, and a correspondingly smaller period of time would be required to heat the coil at 28 volts representing a high charge condition of the battery. At 28 volts the coil might reach a temperature of 2100° F. before the thermostatic switch unit 79 is operated in response to a 200° F. temperature of the mixing means. All of the energy from the battery would thus be applied on the coil 58 until the mixing means 21 is heated to a fuel vaporizing temperature of 200° F. Thus the thermostatic switch 79 remains closed until the heat of the mixing means 21 is sufficient to move it to an open position to provide for the connection of the resistor 88 in series with the electrical heating unit 58 whereby to decrease the current flow therethrough. Closing of the thermostatic unit 79, therefore, shunts the resistor 88 to provide for a full energy supply to the coil 58 with opening of the switch unit 79 providing for a portion of the current flow through the heater 58 being dissipated in the resistor 88.

The current decrease effected by the resistor 88 is such that the temperature of the coil 58 is limited to some value below 1600° F. and in the neighborhood of 1200° F. The coil thus functions as a stand by unit rather than being eliminated entirely as a source of heat for vaporizing the fuel admitted to the mixing chamber 48 after ignition has been initiated. When the temperature of the mixing means 21 decreases to below 200° F. the switch unit 79 closes to again provide for a full current flow through the coil 58 to heat the same. It is seen, therefore, that any prolonged operation of the coil at its upper temperature limit is eliminated while providing for an efficient operation of the heater. It is apparent also that the resistor 88 may be cut in while the coil 58 is operated on 20 volts, since the operation of the switch unit 79 is in response to the temperature of the mixing means 21. In other words the operation of the coil 58 is predicated on the heat of the mixing means 21 so that such means will always be at a fuel vaporizing temperature during the normal operation of the liquid fuel heater.

Referring to Fig. 5 there is shown a control circuit in which the motor 32 and coil 58 are connected together in series while the resistor 88 is adapted to be connected in parallel with the coil 58. In this control circuit the circuit for the pump 38 from the battery 69 includes conductor 91, control switch 92, terminal 93, the pump 38, breaker assembly 39 and the ground connection 94. The circuit for the motor 32 from the terminal 93 includes the motor field 76, the motor 32, conductors 96 and 97, coil 58 and the connection 98 to the ground 99. The resistor 88 and the thermostatic switch unit 79 are connected together in series, with the switch 79 connected to the junction of the conductors 96 and 97 and the resistor 88 to the ground 101.

The motor 32 also functions as a current limiting device in the control circuit for limiting the current supplied to the coil 58 from the energy source 69. The thermostatic switch unit 79 is normally open and is closed to connect the resistor 88 in parallel with the coil 58 in response to the temperature of the mixing means 21 whereby to shunt a portion of the current flow from the coil 58 for the reasons fully noted above in connection with Fig. 6.

The circuit in Fig. 7 is substantially similar to the control circuit of Fig. 5 except that a ballast resistor R is substituted for the motor 32 for controlling the current flow to the coil 58. Thus when the main control switch 102 in Fig. 7 is in its closed position, indicated in dotted lines, the circuit for the motor 32 from the battery 69 includes conductor 103, switch arm 104, conductors 106 and 107, motor field coil 76, the motor 32, and a connection 108 to the ground 109. The circuit for the fuel pump 38 is common with that of the motor up through the conductor 106 and from conductor 106 includes conductor 111, the pump 38, breaker assembly 39 and a ground connection 112. The circuit for the coil 58 from the battery 69 includes conductor 103, switch arm 113, conductor 114, the ballast resistor R, conductor 116, the coil 58, and a ground connection 117. The resistor 88 for decreasing the current flow through the heater coil 58 is connected in series with the thermostatic switch unit 79, this series circuit being connected in parallel with the heater coil 58. Thus when the switch 102 is initially closed the fuel pump 39, motor 32 and coil 58 are simultaneously energized, the resistor R serving to determine the current flow through the heater coil 58. The thermostatic unit 79 closes at a temperature corresponding to a temperature of about 200° F. of the mixing means 21 to shunt a portion of the current from the coil 58 through the resistor 88 so as to decrease the operating temperature thereof.

The circuit of Fig. 8 is substantially similar to the circuit of Fig. 6 except that a ballast resistor R is included in the circuit of the heating coil 58 in series with the resistor 88 and the heating coil, the motor 32 and pump 39 being operated in parallel directly from the battery 69. In the operation of this circuit, on initial closing of the switch 102, the energy from the battery 69 is applied on the coil 58 through the ballast resistor R and the thermostatic switch 79, the resistor 88 being shunted through the normally closed thermostatic switch 79. The ballast resistor R functions to control the current flow to the heating coil 58 so that the coil will operate at substantially its full load. On heating of the conditioning means 21 to at least a fuel vaporizing temperature the thermostatic switch 79 is opened to connect the resistor 88 in series with the ballast resistor R and heating coil 58 to reduce the current flow to the heating coil 58 so that the coil continues its fuel heating function at only part load.

The control circuit in Fig. 9 is identical in all respects to the control circuit of Fig. 6 except that the heater coil 58 of Fig. 6 is replaced by a separate heating coil 118 adapted to vaporize the fuel and an igniting coil 119, connected in series with each other and with the resistor 88. The operation of this control circuit is identical in all respects to the operation of the control circuit of Fig. 6 with the temperatures of the heating coil 118 and the igniting coil 119 being relatively determined.

From a consideration of the above description and drawings, therefore, it is seen that the invention provides an electric heater system for a liquid fuel burner in which the heater coil is adapted to be efficiently operated over a prolonged operating life. The voltage control circuit may be utilized to always maintain a substantially constant operating voltage on the coil from a variable supply source corresponding to the lower limit of the power supply, or it may function to retain the operation of the coil between safe operating temperatures therefor. It is apparent of course that the thermostatic switch unit in the control circuit may be responsive directly to the temperature of the heater coil 58 so as to maintain its operating temperature substantially constant. In conjunction with the operation of the heater coil at temperatures providing for a prolonged life thereof, the invention provides further means for maintaining the heater coil completely out of the path of the combustible mixture to be ignited, with the burning of the ignited mixture taking place at a point or zone remotely located from the heater coil. The corrosive actions resulting from the contact of fuel on a heater coil, as well as the action thereon by flames of combustion is thus entirely eliminated. It is seen, therefore, that the electric heater system of this invention provides in all for a maximum operating life of the coil at high efficiency. The term "heater coil" as used in the description applies generally to a heater coil adapted for either igniting or heating purposes.

Although the invention has been described with reference to several preferred embodiments thereof, it is to be understood that it is not to be so limited since various changes and modifications can be made therein which are within the full intended scope of this invention as defined by the appended claims.

I claim:

1. In internal combustion heating apparatus which is provided with means defining a combustion chamber, a fuel and air mixing unit opening into said combustion chamber and operative to deliver a mixture of fuel and air to said chamber, electrical heating means open to said combustion chamber but removed from the combustion zone therewithin and positioned to preheat the fuel and air during its passage through said unit into said combustion chamber, means for energizing said heating means at a voltage sufficient to produce fuel ignition within said chamber, and temperature responsive means for reducing to a lesser but appreciable value the voltage applied to said heating means after fuel ignition within said zone is initiated, thereby to provide for continued preheating of the fuel mixture traversing said mixing unit by said heating means.

2. As an article of manufacture, an electric heater unit having a tubular body portion composed of mica, a resistor wound around said body portion, and a porcelain coating applied on the outer periphery of said body portion such that at least the outer half of said resistor is bare.

3. In internal combustion heating apparatus which is provided with means defining a combustion chamber, a fuel and air mixing unit opening into said combustion chamber and operative to deliver a mixture of fuel and air to said chamber, electrical heating means open to said combustion chamber but removed from the combustion zone therewithin and positioned to preheat the fuel and air during its passage through said unit into said combustion chamber, means for energizing said heating means at a voltage sufficient to raise the temperature of said heating means to a predetermined value sufficient to produce fuel ignition within said chamber, and means responsive to the temperature of said unit for reducing to a lesser but appreciable value the voltage applied to said heating means each time the temperature of said heating means rises to said predetermined value, thereby to provide for continued preheating of the fuel mixture traversing said mixing unit by said heating means.

4. In internal combustion heating apparatus which is provided with means defining a combustion chamber, a fuel and air mixing unit provided with a mixing chamber which opens into said combustion chamber and through which a mixture of fuel and air may be delivered to said combustion chamber, electrical heating and ignition means open to said combustion chamber but removed from the combustion zone therewithin and positioned within said mixing chamber to preheat the fuel and air during its passage through said mixing chamber into said combustion chamber, means for energizing said heating and ignition means to produce fuel ignition within said combustion chamber, temperature responsive means for reducing the current flow through said heating and ignition means after fuel ignition within said combustion chamber is initiated, thereby to provide for continued preheating of the fuel and air traversing said mixing chamber by said heating and ignition means, and means at least partially enclosing said heating means to prevent the fuel from contacting said heating and ignition means during its passage through said mixing chamber.

5. In internal combustion heating apparatus which is provided with means defining a combustion chamber, a heat transfer tube opening into said chamber at one end thereof and substantially closed at the opposite end thereof, electrical heating and ignition means extending longitudinally of said tube and disposed inwardly of the open end thereof, means for passing fuel and air into said chamber through a passage which surrounds said tube, whereby the fuel and air are preheated prior to the entry thereof into said combustion chamber, means for energizing said electrical means to produce fuel and air preheating and to produce fuel ignition in a zone removed from the open end of said tube, and temperature responsive means for providing a reduced current flow through said heating means after fuel ignition within said combustion chamber is initiated.

6. In internal combustion heating apparatus which is provided with means defining a combustion chamber, a heat transfer tube opening into said chamber at one end thereof and substantially closed at the opposite end thereof, electrical heating and ignition means extending longitudinally of said tube and disposed inwardly of the open end thereof, means for passing fuel and air into said chamber through a passage which surrounds said tube, whereby the fuel and air are preheated prior to the entry thereof into said combustion chamber, a circuit for energizing said electrical means, means for completing said circuit, thereby to produce fuel and air preheating and to produce fuel ignition in a zone removed from the open end of said tube, a resistor adapted to be connected into said circuit to decrease the flow of current through said electrical means, and thermostatic switch means controlled in accordance with the temperature of said electrical means for connecting said resistor into said circuit after fuel combustion within said chamber is initiated.

7. As an article of manufacture an electric heating unit including a mica body portion, a conductor incapable of self-support wound on said body portion, said body portion having a thickness less than the diameter of said conductor, and a coating of insulating material applied on said body portion between the portions of said conductor such that at least the outer half of said conductor is bare, said coating bonding together said body portion and conductor and stiffening said body portion to support said conductor.

8. As an article of manufacture an electric heater unit adapted when operated to radiate a maximum of heat including an insulating non-heat conducting body portion, a conductor incapable of self-support supported on said body portion, with said body portion having a thickness less than the diameter of said conductor, and a porcelain coating applied on said body portion between the portions of said conductor so as to leave said conductor exposed, said porcelain coating maintaining said conductor portions in a spaced relation on said body portion and stiffening said body portion to support said conductor.

9. As an article of manufacture an electric resistance unit of a construction adapted to operate to radiate substantially the full heat output thereof including an insulating non-heat conducting body portion, a resistor incapable of self-support wound about said body portion, with the thickness of said body portion being only a fractional part of the diameter of said conductor, and a coating of insulating bonding material applied on said body portion between the portions of said resistor so that said resistor is exposed, said coating protecting substantially the entire peripheral surface of said body portion from the heat of said resistor and stiffening said body portion to support said resistor.

10. As an article of manufacture an electric heater unit constructed to radiate a maximum of heat, the means for supporting said conductor while providing for a minimum dissipation of heat from said conductor to said supporting means including an insulating non-heat conducting body portion having a thickness less than the diameter of said conductor, and an insulating coating material applied on the periphery of said body portion and about a portion of said conductor to bond said body portion and conductor together, said coating serving to stiffen said body portion to support said conductor.

HARRY B. HOLTHOUSE.